United States Patent
Mathon et al.

(10) Patent No.: US 8,524,026 B2
(45) Date of Patent: Sep. 3, 2013

(54) FORMER FOR FABRICATING A COMPOSITE MATERIAL CASING FOR A GAS TURBINE

(75) Inventors: Richard Mathon, Brunoy (FR); Olivier Patrigeon, Nanterre (FR)

(73) Assignee: SNECMA, Paris (FR)

( * ) Notice: Subject to any disclaimer, the term of this patent is extended or adjusted under 35 U.S.C. 154(b) by 185 days.

(21) Appl. No.: 12/777,513

(22) Filed: May 11, 2010

(65) Prior Publication Data

US 2010/0288429 A1 Nov. 18, 2010

(30) Foreign Application Priority Data

May 12, 2009 (FR) ..................................... 09 53118

(51) Int. Cl.
*B65H 81/00* (2006.01)
*B29C 45/14* (2006.01)

(52) U.S. Cl.
USPC ........... 156/189; 156/169; 156/245; 156/447; 249/102; 264/258; 264/275; 425/183; 425/185; 425/189

(58) Field of Classification Search
USPC .................. 156/169, 189, 194, 447, 469, 173, 156/170, 175, 245; 425/185, 393, 183, 186; 249/102, 63; 242/448; 264/258, 278
See application file for complete search history.

(56) References Cited

U.S. PATENT DOCUMENTS

| | | | | |
|---|---|---|---|---|
| 180,450 A | * | 8/1876 | Beck | 249/103 |
| 833,836 A | * | 10/1906 | Brooks | 249/112 |
| 3,489,629 A | * | 1/1970 | Winters et al. | 156/165 |
| 4,080,915 A | * | 3/1978 | Bompard et al. | 112/412 |
| 4,529,139 A | * | 7/1985 | Smith et al. | 242/437.3 |
| 4,600,619 A | * | 7/1986 | Chee et al. | 428/118 |
| 5,468,329 A | * | 11/1995 | Philpot et al. | 156/429 |
| 5,558,738 A | * | 9/1996 | Rector | 156/175 |
| 5,685,933 A | * | 11/1997 | Ohta et al. | 156/175 |
| 5,686,038 A | * | 11/1997 | Christensen et al. | 264/257 |
| 5,897,739 A | * | 4/1999 | Forster et al. | 156/285 |
| 6,149,851 A | | 11/2000 | Deckers et al. | |
| 2001/0017183 A1 | * | 8/2001 | Cornelius et al. | 156/189 |
| 2008/0206048 A1 | * | 8/2008 | Coupe et al. | 415/200 |
| 2009/0110764 A1 | * | 4/2009 | Kuo | 425/186 |

FOREIGN PATENT DOCUMENTS

EP 1 961 923 A2 8/2008

OTHER PUBLICATIONS

Rosato, D.V., D.V. Rosato, and M.G. Rosato, Injection Molding Handbook, Third Edition, Kluwer Academic Publishers, 2000, pp. 305-306 and 334-343.*

* cited by examiner

*Primary Examiner* — William Bell
(74) *Attorney, Agent, or Firm* — Oblon, Spivak, McClelland, Maier & Neustadt, L.L.P.

(57) ABSTRACT

A former for fabricating a gas composite material casing for a gas turbine, which is obtained by forming fiber reinforcement as superposed layers of a fiber texture and densifying the fiber reinforcement with a matrix, is disclosed. The former has two cheekplates and an annular wall with an outside surface presenting a profile that corresponds to the profile of the inside surface of the casing that is to be fabricated. The annular wall of the former includes a removable fastener device for fastening a fiber texture layer and serving to hold the first layer of the fiber texture mechanically while the fiber texture is being wound on the former.

15 Claims, 1 Drawing Sheet

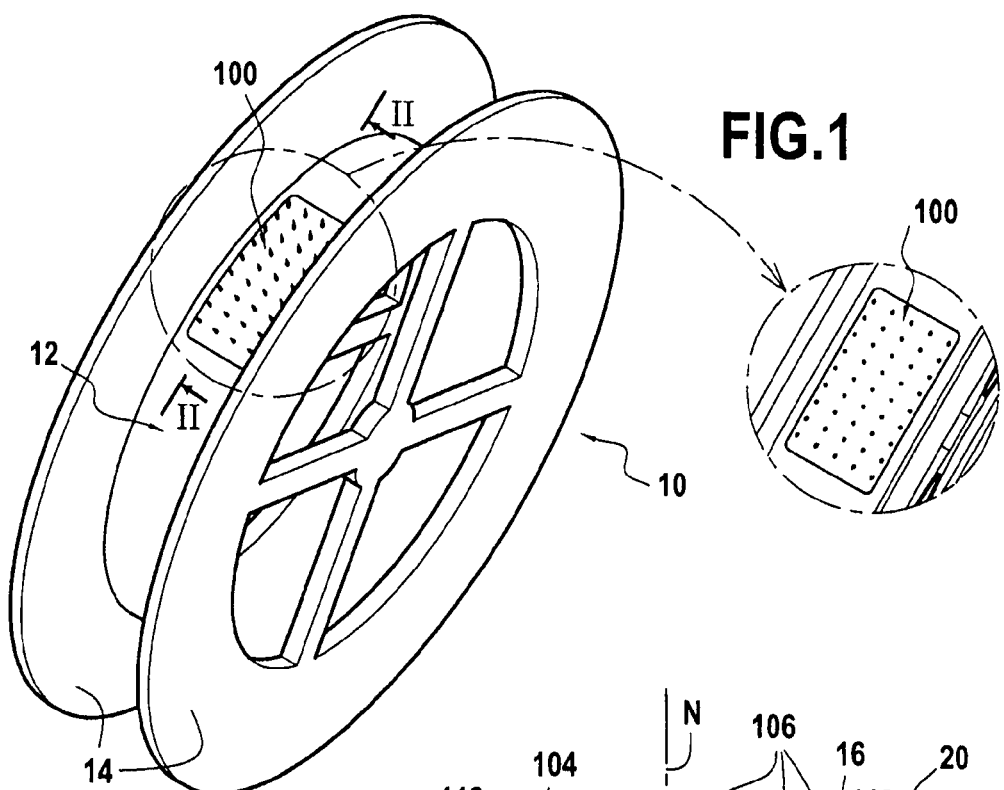
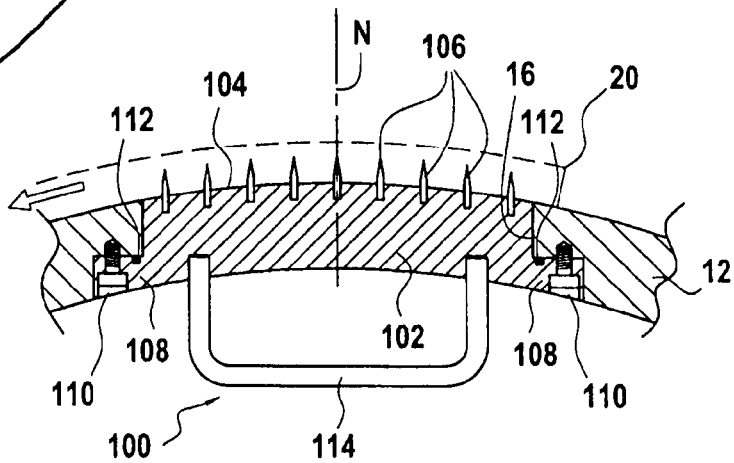
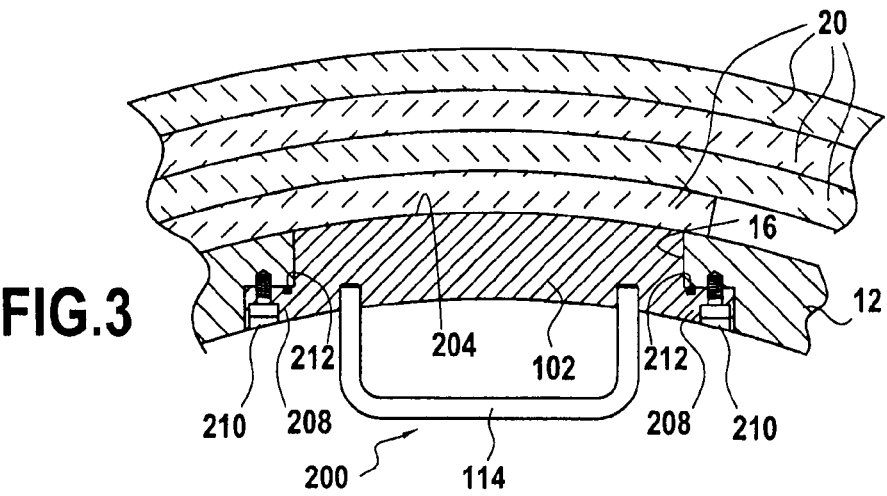

FORMER FOR FABRICATING A COMPOSITE MATERIAL CASING FOR A GAS TURBINE

BACKGROUND OF THE INVENTION

The present invention relates to the general field of gas turbine casings, and more particularly to retention casing for gas turbine fans in aeroengines.

In a gas turbine aeroengine, a fan casing performs several functions. It defines the air inlet passage into the engine, it supports an abradable material facing the tips of the fan blades, it supports an optional soundwave absorber structure for noise treatment at the inlet to the engine, and it incorporates or supports a retention shield. The shield constitutes a trap for retaining debris such as ingested bodies or fragments of damaged blades that are projected outwards by centrifugal force, so as to prevent them from passing through the casing and reaching other portions of the aircraft.

Proposals have already been made to make a fan retention casing out of composite material. By way of example, reference may be made to document EP 1 961 923 that describes fabricating a composite material casing of varying thickness by a method that includes forming fiber reinforcement out of superposed layers of a fiber texture and densifying the fiber reinforcement with a matrix. According to that invention, the fiber texture is made by three-dimensional weaving with thickness that varies, and it is wound as a plurality of superposed layers on a former of profile that corresponds to the profile of the casing to be fabricated. The fiber preform as obtained in that way is held on the former and it is impregnated with resin prior to polymerizing the resin. Winding a woven texture of varying thickness onto a former, as described in that document, makes it possible to obtain directly a tubular preform that has the desired profile with varying thickness.

In practice, implementing that method raises the problem of holding the fiber preform while it is being wound on the former. During winding, it is appropriate to exert sufficient traction force on each layer of the fiber texture to ensure that the layers are compacted effectively. In particular, that requires the first fiber texture layer that is wound on the former to be secured correctly thereto prior to winding the following layers.

OBJECT AND SUMMARY OF THE INVENTION

A main object of the present invention is thus to mitigate such drawbacks by proposing a former that enables the fiber texture to be held thereon while it is being wound.

This object is achieved by a former for fabricating a composite material casing for a gas turbine, the former having two cheekplates and an annular wall with an outside surface of profile that corresponds to the profile of the inside surface of the casing to be fabricated, wherein the annular wall includes removable fastener means for fastening a fiber texture layer, which means serve to hold the first layer of the fiber texture mechanically while the fiber texture is being wound on the former.

The former of the present invention presents numerous advantages. In particular, it enables the fiber preform to be put under mechanical tension while it is being wound on the former so as to optimize the compacting of the preform. In addition, the fastener means of the former are removable, thus enabling them to be removed before impregnation with resin so as to avoid any risk of the preform being degraded during the hot polymerization operation. Finally, the first layer of the fiber texture is held on the former mechanically (and not chemically), thereby ensuring that the holding effect is completely harmless for the preform prior to being impregnated with the resin.

Advantageously, the former includes a removable fastener plate for fastening a layer of fiber texture, the plate being designed to be received in a recess of complementary shape passing through the annular wall of the former, the outside surface of the plate, when in position, reconstituting the profile of the outside surface of the annular wall, and presenting a plurality of spikes projecting radially outwards and designed to hold the first layer of the fiber texture mechanically while the fiber texture is being wound on the former.

More advantageously, when the fastener plate is in position, its spikes form an angle lying in the range 0° to 20° relative to the normal to the outside surface of the annular wall of the former. Such an angle serves to optimize fastening of the first fiber texture layer on the former, and thus optimize winding it under tension.

The spikes of the fastener plate extend from the outside surface of the plate over a height of about 4 millimeters (mm). Such a height is less than the thickness of a layer of the fiber texture for making a fan retention casing of an aviation turbomachine.

The fastener plate and the former may be made of aluminum, and the spikes are made of steel. Specifically, aluminum is suitable because it is light in weight, strong, and suitable for the thermal stresses to which the former is subjected during the casing fabrication process.

The spikes of the fastener plate may be arranged in a circumferential direction and in an axial direction and are regularly spaced apart from one another.

Advantageously, the former further includes means for securing the fastener plate in the annular wall of the former, said means being accessible from inside the former. For this purpose, the fastener plate may include flanges that are designed, when in place, to be screwed to the annular wall of the former from inside said former. Thus, the fastener plate is made removable towards the inside of the former, thus making it possible to remove it while the fiber texture is still wound on the former.

Furthermore, the fastener plate may include a handle that is accessible from inside the former when the plate is in position in order to make it easier to remove.

The invention also provides a method of fabricating a composite material casing for a gas turbine engine, the method consisting in forming fiber reinforcement as superposed layers of a fiber texture made by three-dimensional weaving, and in densifying the fiber reinforcement with a matrix, wherein the fiber texture is wound as a plurality of superposed layers on a former as defined above.

BRIEF DESCRIPTION OF THE DRAWING

Other characteristics and advantages of the present invention appear from the following description made with reference to the accompanying drawing, showing an embodiment having no limiting character. In the figures:

FIG. 1 is a perspective view of a former of the invention;
FIG. 2 is a section view on II-II of the FIG. 1 former; and
FIG. 3 is a view corresponding to FIG. 2 and showing the former after the fiber texture has been wound on and before it has been impregnated.

DETAILED DESCRIPTION OF AN EMBODIMENT

The invention is described below in the context of its application to fabricating a fan casing for a gas turbine aeroengine.

The fan casing is made of composite material comprising fiber reinforcement densified by a matrix, the reinforcement possibly being of carbon, glass, aramid, or ceramic fibers, for example, and the matrix being a polymer, e.g. an epoxy, a bismaleimide, or a polyimide.

According to a particular feature of fabricating a fan casing out of composite material, the fiber reinforcement is formed by winding onto a former a fiber texture that has itself been made by three-dimensional weaving. As shown in FIG. 1, this former 10 comprises an annular wall 12 having an outer wall of profile that corresponds to the inside surface of the fan casing to be fabricated, and having at each of its two ends, a respective cheekplate 14 corresponding to the upstream and downstream flanges of the casing that enable it to be assembled with other elements and bonded thereto.

As described in detail in document EP 1 961 923, to which reference may be made, fabricating the fan casing out of composite material includes in particular a step of three-dimensional weaving making use of warp yarns on a drum of profile that is selected as a function of the profile of the casing to be made. A fiber texture is thus obtained that is wound in several layers or turns on the former 10 of FIG. 1. By being wound on the former, the fiber texture fits closely to the profile thereof and its axial end portions are raised over the cheekplates 14 to form preform portions that correspond to the upstream and downstream flanges of the casing.

With the preform held in place on the former 10, impregnation is subsequently performed using a resin. For this purpose, a flexible bag or bladder is applied against the preform. Impregnation may be assisted by establishing a pressure difference between the outside and the volume as defined by the former and the bladder that contains the preform. After impregnation, a step of polymerizing the resin is then performed.

According to the invention, the former 10 includes a removable fastener device 100 for fastening to a fiber texture layer 20, said device serving to hold the first layer of the fiber texture mechanically in place while the texture is being wound on the former.

More precisely, as shown in FIG. 2, the device 100 comprises a removable plate 102 for fastening a fiber texture layer, said plate being received in a recess 16 of corresponding shape that passes through the annular wall 12 of the former 10.

The outside surface 104 of the fastener plate 102 is profiled so as to reconstitute the profile of the outside surface of the annular wall once the plate is mounted in the former. It also has a plurality of spikes 106 that project radially outwards and that serve to fasten the first layer of former texture mechanically in place when it is wound on the former. The fastener plate 102 and the former 10 are preferably made of the same material, e.g. aluminum, while the spikes 106 are advantageously made of steel.

The spikes 106 are bonded to the fastener plate 102 by adhesive, for example. Each spike extends at an angle lying in the range 0° to 20° relative to the normal N to the outside surface of the annular wall 12 of the former. This angle is preferably identical for all of the spikes so as to make it easier to withdraw the plate without damaging the fiber texture.

In addition, the spikes 106 extend from the outside surface 104 of the fastener plate over a height of about 4 mm, which height is less than the thickness of the first layer of the fiber texture. The spikes are also polished at their tips. The roughness $R_a$ of the spikes is less than 1.6 micrometers (μm), and preferably less than 0.8 μm, so as to damage the fiber texture of the first layer 20 as little as possible.

As shown in FIG. 1, the spikes 106 of the fastener plate 102 are preferably arranged in a circumferential direction and in an axial direction, and they are regularly spaced apart from one another. The number, the pitch, and the area of the spike-covered fastener plate relative to the outside surface area of the annular wall depend on numerous parameters such as the dimensions and the thickness of the fiber texture layers, the composition thereof, etc.

Means for retaining the fastener plate 102 in the recess 16 of the annular wall 12 of the former are also provided.

By way of example, and as shown in FIG. 2, the fastener plate 102 may have two opposite flanges 108 that are secured to the annular wall of the former by means of screws 110, it being possible also to insert sealing gaskets 112 between the flanges and the annular wall of the former. The fastener plate 102 also includes a handle 114.

The screws 110 for securing the fastener plate 102 in the annular wall of the former, and the handle 114, are preferably accessible from inside the former. Thus, the fastener plate 102 may be removed towards the inside of the former once the fiber texture layers 20 have been properly wound on the former.

Once the fastener plate 102 has been withdrawn, it is preferable to replace it with a leaktight shutter 200, as shown in FIG. 3. This shutter is completely identical with the fastener plate 102 except that it does not have any spikes. In particular, it presents an outside surface 204 that reconstitutes the profile of the outside surface of the annular wall 12 of the former and it is suitable for being secured therein by means of flanges 208 and screws 210 (and sealing gaskets 212 may also be inserted). The shutter also has a handle 114 that is accessible from inside the former.

The use of a former of the invention in the fabrication of a composite material fan casing stems clearly from the above description.

The fastener plate 102 is mounted and secured in the recess 16 in the annular wall 12 of the former. The layers of fiber texture are then wound on the former with the end thereof being positioned over the fastener plate 102. The spikes 106 of the plate penetrate between the fibers of the first layer 20 of the fiber texture wound on the former so as to hold it mechanically. Because the first layer is held in place, it is possible to exert an appropriate traction force on each layer of the fiber texture while it is being wound on the former. Once the entire fiber texture has been wound onto the former, the fastener plate 102 is removed from the former and replaced by the shutter 200 that is itself secured in the recess 16 in the annular wall 12 of the former. The fiber texture as wound in this way on the former can then be subjected to resin impregnation and to polymerization of the resin without risk of damaging the fiber texture.

What is claimed is:

1. A method of fabricating a composite material casing for a gas turbine engine using a former comprising: two cheekplates; an annular wall having an outside surface of profile that corresponds to a profile of an inside surface of the casing that is to be fabricated; a removable fastener plate for fastening a layer of fiber texture, the plate being designed to be received in a recess of complementary shape passing through the annular wall of the former, an outside surface of the plate, when in position, reconstituting a profile of the outside surface of the annular wall, and presenting a plurality of spikes projecting radially outwards and designed to hold only the first layer of the fiber texture mechanically while the fiber texture is being wound on the former; and a shutter free of spikes that replaces the removable fastener plate and is designed to be received in the recess of complementary shape passing through the annular wall of the former, the outside surface of the plate, when in position, reconstituting the profile of the outside surface of the annular wall, the method comprising:

mounting and securing the removable fastener plate in the recess in the annular wall of the former;

winding layers of fiber texture on the former with an end thereof being positioned over the fastener plate;

penetrating between fibers of the first layer of the fiber texture wound on the former with the spikes of the plate so as to hold only the first layer mechanically;

exerting a traction force on each layer of the fiber texture while each layer is being wound on the former;

removing the fastener plate from the former;

replacing the fastener plate with the shutter;

securing the shutter in the recess in the annular wall of the former; and subjecting the wound fiber texture to resin impregnation and to polymerization of the resin, wherein a height of the spikes is less than a thickness of the first layer of the fiber texture.

2. The method according to claim 1, wherein, when the fastener plate is in position, the spikes form an angle lying in a range 0° to 20° relative to a normal to the outside surface of the annular wall of the former.

3. The method according to claim 2, wherein the angle formed by the spikes is identical for all of the spikes.

4. The method according to claim 1, wherein the spikes of the fastener plate extend from the outside surface of the plate over a height of about 4 mm.

5. The method according to claim 1, wherein the fastener plate and the former are made of aluminum, and the spikes are made of steel.

6. The method according to claim 1, wherein the spikes of the fastener plate are arranged in a circumferential direction and in an axial direction and are regularly spaced apart from one another.

7. The method according to claim 1, wherein the former further includes means for securing the fastener plate in the annular wall of the former, said means being accessible from inside the former.

8. The method according to claim 7, wherein the fastener plate includes flanges that are designed, when in place, to be screwed to the annular wall of the former from inside said former.

9. The method according to claim 8, wherein sealing gaskets are inserted between the flanges of the fastener plate and the annular wall of the former.

10. The method according to claim 1, wherein the fastener plate includes a handle that is accessible from inside the former when the plate is in position.

11. The method according to claim 1, wherein the former further includes means for securing the shutter in the annular wall of the former, said means being accessible from inside the former.

12. The method according to claim 11, wherein the shutter includes flanges that are designed, when in place, to be screwed to the annular wall of the former from inside said former.

13. The method according to claim 12, wherein sealing gaskets are inserted between the flanges of the shutter and the annular wall of the former.

14. The method according to claim 1, wherein the shutter includes a handle that is accessible from inside the former when the shutter is in position.

15. The method according to claim 1, wherein the recess in the annular wall of the former is rectangular in shape.

* * * * *